US012427705B2

(12) United States Patent
Lovranich et al.

(10) Patent No.: US 12,427,705 B2
(45) Date of Patent: Sep. 30, 2025

(54) DEVICE AND METHOD FOR EXTRUDING PLASTIC

(71) Applicant: Starlinger & Co Gesellschaft m.b.H., Vienna (AT)

(72) Inventors: Christian Lovranich, Weissenbach an der Triesting (AT); Andreas Pechhacker, Altenmarkt (AT); Dominic Stangl, Biedermannsdorf (AT)

(73) Assignee: Starlinger & Co Gesellschaft m.b.H., Vienna (AT)

( * ) Notice: Subject to any disclaimer, the term of this patent is extended or adjusted under 35 U.S.C. 154(b) by 320 days.

(21) Appl. No.: 17/044,574

(22) PCT Filed: Jun. 19, 2019

(86) PCT No.: PCT/EP2019/066214
§ 371 (c)(1),
(2) Date: Oct. 1, 2020

(87) PCT Pub. No.: WO2020/002096
PCT Pub. Date: Jan. 2, 2020

(65) Prior Publication Data
US 2021/0094217 A1 Apr. 1, 2021

(30) Foreign Application Priority Data
Jun. 27, 2018 (EP) .................................... 18180128

(51) Int. Cl.
*B29C 48/14* (2019.01)
*B29C 48/285* (2019.01)
(Continued)

(52) U.S. Cl.
CPC .......... *B29C 48/143* (2019.02); *B29C 48/286* (2019.02); *B29C 48/2886* (2019.02);
(Continued)

(58) Field of Classification Search
CPC .......... B29C 2948/9218; B29C 48/297; B29C 48/286; B29B 7/90
See application file for complete search history.

(56) References Cited

U.S. PATENT DOCUMENTS 4,754,413 A * 6/1988 Koster ................ B29C 48/2888
264/40.5
5,148,943 A * 9/1992 Moller ................... B29B 7/728
222/64

(Continued)

OTHER PUBLICATIONS

International Search Report issued in Application No. PCT/EP2019-066214 dated Sep. 2, 2019.

*Primary Examiner* — Andrew D Graham
(74) *Attorney, Agent, or Firm* — Workman Nydegger

(57) ABSTRACT

A device and a method for extruding plastics, comprising an extruder screw, a housing with a cavity, a drive unit for rotatably driving the extruder screw, a heating element arranged on the housing alongside the extruder screw, a filling unit through which shredded plastic can be supplied into the cavity, and a filler metering device. Upon rotation, the extruder screw conveys the shredded plastic in the transport direction along a longitudinal axis of the extruder screw. The housing has a feeding port for the filler opening into the cavity, wherein the filler metering device is connected to the feeding port and is designed for supplying a filler dispersed in a gas stream into the cavity.

8 Claims, 3 Drawing Sheets

Figure 1:
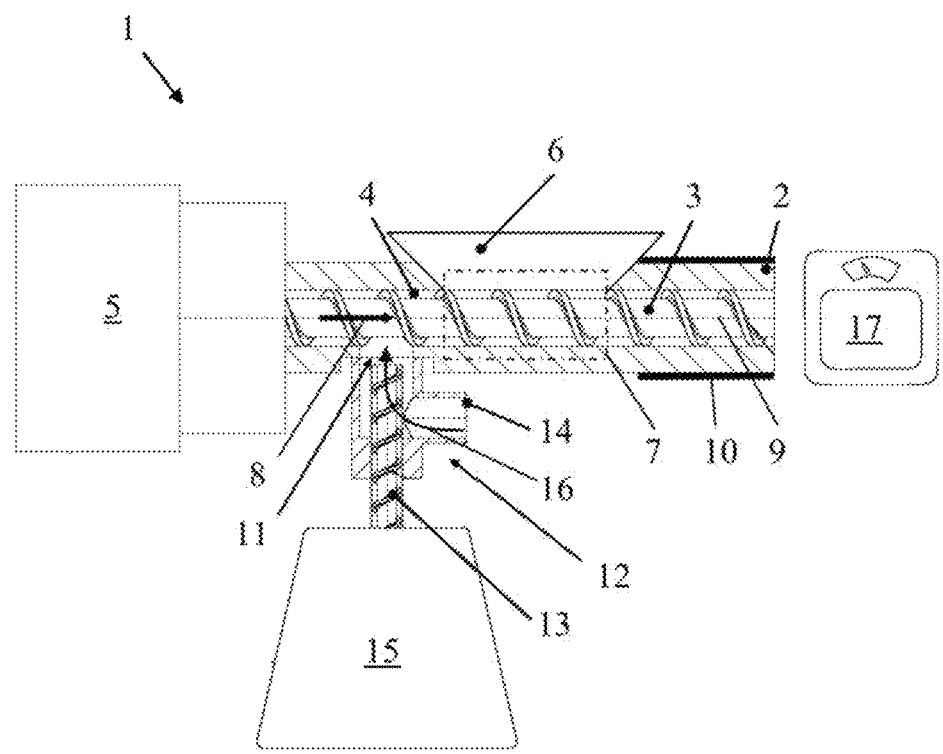

(51) Int. Cl.
   *B29C 48/385* (2019.01)
   *B29C 48/80* (2019.01)
   *B29C 48/92* (2019.01)

(52) U.S. Cl.
   CPC .......... *B29C 48/297* (2019.02); *B29C 48/298* (2019.02); *B29C 48/385* (2019.02); *B29C 48/832* (2019.02); *B29C 48/92* (2019.02); *B29C 2948/922* (2019.02); *B29C 2948/9239* (2019.02)

(56) References Cited

U.S. PATENT DOCUMENTS

| | | | | |
|---|---|---|---|---|
| 5,281,379 A | * | 1/1994 | Noguchi | B29B 7/007 264/102 |
| 2005/0063246 A1 | * | 3/2005 | Ponzielli | B29B 7/487 366/85 |
| 2012/0321836 A1 | | 12/2012 | Aisenbrey | |

* cited by examiner

DEVICE AND METHOD FOR EXTRUDING PLASTIC

The present application is a U.S. National Stage of International Application No. PCT/EP2019/066214, filed on Jun. 19, 2019, designating the United States and claiming the priority of European Patent Application No. 18180128.3 filed with the European Patent Office on Jun. 27, 2018. All of the aforementioned applications are incorporated herein in their respective entireties by this reference.

The invention relates to a device and a method for extruding plastics according to the preamble of claim 1 and claim 8.

From AT 507 971 A1, a plastic extruder for extruding plastics is known, which comprises a housing with a cavity in which an extruder screw is rotatably mounted. The extruder screw is driven by a drive unit. Alongside the extruder screw, heating elements are arranged on the housing by means of which thermal energy can be introduced into the cavity. Via a filling unit connected to the housing in a feed zone of the extruder screw, shredded plastic is supplied into the cavity. Upon rotation, the extruder screw conveys the shredded plastic in the transport direction along a longitudinal axis of the extruder screw, whereby the plastic is melted by the thermal energy introduced into the cavity by the heating elements. The melted extruded plastic is discharged from the cavity through a discharge port arranged at the end of the cavity and is supplied to further use.

In order to modify the properties of the plastic and/or to cut down on material costs, filler can be added to the plastic via a filler metering device. Fillers are, for example, carbonates such as, in particular, calcium carbonate $CaCO_3$, silicates, talc, oxides, etc., or else short fibres, in particular glass fibres or carbon fibres. The fillers are added to the plastic by means of the filler metering device either as a master batch or in bulk, for example in the form of a powder or in the form of granules, wherein it is most cost-efficient to add the filler in the form of a powder. The fillers are either added to the plastic in the feed zone of the extruder screw, or the plastic is mixed with the filler and supplied to the device already in a premixed state. More detailed information in this regard can be found, for example, in document AT 508 100 A2 or in document WO 2009/121085 A1.

From document US 2012/321836 A1, a device for extruding plastics is known which comprises an extruder screw, a housing with a cavity in which the extruder screw is rotatably arranged, a drive unit for rotatably driving the extruder screw, a heating element, a filling unit which is connected to the housing in a feed zone of the extruder screw and through which shredded plastic can be supplied into the cavity, and a filler metering device. Upon rotation, the extruder screw conveys the shredded plastic in the transport direction along a longitudinal axis of the extruder screw, carrying it out of the cavity through a discharge port in the housing. The housing has a feeding port opening into the cavity for the filler conveyed by the filler metering device. From FIG. 9 of said document, it is evident that the feeding port is not arranged in the feed zone or in front of it, but behind.

However, the methods of adding the powdery filler to shredded plastic as known from the prior art have proved to be disadvantageous in that, with a filler/plastic ratio higher than $1/10$, inadequate mixing of the filler with the plastic might occur, as a result of which lumps of filler are formed. However, on the one hand, pressure fluctuations arise at the discharge port of the extruder due to the filler lumps, which poses a problem for a cleaning of the extruded plastic which occurs subsequent to the extrusion, and, on the other hand, extruded plastic is formed with an unevenly distributed filler content. This creates problems especially during the production of films, fibres and other thin products, since cracks may occur due to the unevenly distributed filler content.

It is thus the object of the present invention to provide a device and a method by means of which the above-mentioned disadvantages of the prior art are avoided and plastic having a high filler content of high quality can be produced.

According to the invention, the present object is achieved by a device having the features of the characterizing part of claim 1 and with a method having the features of the characterizing part of claim 8. Preferred embodiments of the invention are the subject matter of the dependent claims.

In the device according to the invention, the housing has a feeding port opening into the cavity. The feeding port is arranged in the transport direction upstream of the feed zone or within the feed zone of the extruder screw, in which case the feeding port does not have to be arranged within the feed zone over its entire cross-section.

The filler metering device is connected to the feeding port. The filler metering device is designed for supplying a filler, in particular a powdery filler, dispersed in a gas stream into the cavity. As the gas stream passes through the shredded plastic, the powdery filler adheres to a surface of the shredded plastic which has not yet been melted or has already been melted at least superficially. The advantage of this is that the filler is supplied to the plastic in a finely distributed form and the filler thus adheres to the shredded plastic in a finely distributed form also in case of filler/plastic ratios higher than $1/10$. As a result, a very uniform mixture of filler and plastic is achieved. If the resultant mixture of plastic and filler is now melted during the further extrusion process, a very homogeneous mass and hence a plastic of very high quality are created. Because of the fine distribution of the filler, formation of filler lumps is reliably prevented.

Air or nitrogen is advantageously used as gas.

In order to remove the gas as completely as possible from the cavity, the housing advantageously has a discharge port opening into the cavity, and the device advantageously comprises a suction device which is connected to the discharge port and is designed for discharging gas from the cavity, which has been introduced into the cavity via the gas stream. The suction device may be formed, for example, by a simple compressor which generates a negative pressure at the discharge port and thus sucks the gas from the cavity. Advantageously, the extraction of the gas from the cavity occurs as a function of an amount of gas in the gas stream supplied to the cavity.

Preferably, the filler metering device has a connection to a gas supply, and the filler metering device comprises a filler conveying device, wherein, due to the gas supply, a gas stream into the cavity can be generated and wherein the filler conveying device is designed for supplying the powdery filler from a reservoir into the gas stream. Advantageously, the gas supply is formed, for example, by an air compressor in the form of a fan which is attached to the filler metering device and which compresses ambient air with a low energy input and thus generates an air stream. Alternatively, the gas supply is formed by an external industrial compressor, and the filler metering device is connected to the compressor via commercially available pneumatic hoses and quick couplings. Suitably, the filler conveying device is formed by a metering screw or two intermeshing metering screws—also referred to as a twin metering screw.

Advantageously, the device according to the invention comprises a throughput scale, which is arranged in the transport direction at the end of the extruder screw and is designed for measuring a mass flow of plastic and filler conveyed through the extruder screw, wherein the filler metering device is designed for supplying filler into the cavity as a function of the mass flow measured by the throughput scale. Advantageously, the throughput scale is attached to the discharge port. As a result, the advantage is obtained that an amount of filler supplied into the cavity is automatically changed during operation as a function of the mass flow measured by the throughput scale, whereby the filler/plastic ratio can be kept very constant.

Advantageously, the filler metering device comprises a gas heating element which heats the gas stream. An advantage of this is that moist fillers, in particular moist powdery fillers, can also be supplied to the device according to the invention without prior drying, since the filler is dried by the heated gas of the gas stream before the latter is introduced into the cavity. The filler attaches itself to the plastic in a dried state. In addition, by drying the powdery filler, any filler lumps formed by moisture during a storage of the powdery filler are smashed and finely distributed. Preferably, the gas heating element is designed such that it uses a waste heat of a heating element of the extruder for heating the gas stream. In this way, the advantage is obtained that energy costs can be minimized.

A heating of the gas stream is particularly advantageous also when hygroscopic plastics are used, since they are sensitive to moisture and a dry powdery filler can be integrated better into a polymer matrix of the plastic.

Further advantageous embodiments of the device according to the invention and of the method according to the invention will be explained in further detail below with reference to the figures.

FIGS. 1 to 5 show different embodiments, respectively, of a device according to the invention in a schematic sectional view.

FIG. 1 shows a first embodiment of a device 1 according to the invention in a schematic sectional view. The device 1 comprises a housing 2 and an extruder screw 3, with the extruder screw 3 being rotatably arranged in a cavity 4 of the housing 2. A drive unit 5 connects to the housing 2, which drive unit is designed for rotatably driving the extruder screw 3. The drive unit 5 is formed, for example, by an electric motor and a transmission. A heating element 10 is formed on the housing 2 alongside the extruder screw 3.

In a feed zone 7 of the extruder screw 3, a filling unit 6 connects to the housing 2. The filling unit 6 is formed by a simple funnel. However, in a further embodiment variant, there is also the possibility that the filling unit 6 is formed by a conveyor. By means of the filling unit 6, shredded plastic can be supplied into the cavity 4, wherein, upon rotation, the extruder screw 3 conveys the shredded plastic in the transport direction 8 along a longitudinal axis 9 of the extruder screw 3 and the shredded plastic is melted by thermal energy introduced into the cavity 4 by means of the heating element 10. At an end of the cavity 4, which is not illustrated, a discharge port is formed in the housing 2 in the transport direction 8, which discharge port is not illustrated. Through the discharge port, extruded plastic is discharged from the housing 2.

Furthermore, the housing 2 has a feeding port 11 opening into the cavity 4. Viewed in the transport direction 8, the feeding port 11 is arranged upstream of the feed zone 7 of the extruder screw 3.

Furthermore, the device 1 according to the invention comprises a filler metering device 12, which is connected to the feeding port 11. The filler metering device 12 comprises a filler conveying device formed by a metering screw 13 and a connection 14 which can be coupled to a gas supply, which is not illustrated. Advantageously, the connection is linked to a pressure controller by means of a quick coupling. The gas supply is implemented by an external compressor, which is connected to the filler metering device 12 by means of the quick coupling and pneumatic hoses. The metering screw 13 is rotatably driven by a second drive unit, which is not illustrated, for example by an electric motor and a transmission.

By air supplied from the compressor, a gas stream, specifically an air stream 16, is generated by the filler metering device 12 across the feeding port 11 into the cavity 4. Via the metering screw 13, a filler, in particular a powdery filler, is fed into the air stream 16 from a reservoir 15 connected to the filler metering device 12, as a result of which the powdery filler is dispersed in the air stream 16 and introduced into the cavity 4. As the air stream 16 passes through the plastic, the powdery filler attaches itself to a surface of the plastic in a finely distributed fashion.

The air introduced into the cavity 4 via the filler metering device 12 is removed from the cavity 4 via a discharge port, which is not illustrated. Advantageously, the discharge port is arranged in the housing 2 in the transport direction 8 upstream or downstream of the feeding port 11, at a distance from the feeding port 11, and comprises a filter. The filter prevents plastic or filler from leaking from the cavity 4.

Furthermore, the device 1 comprises a throughput scale 17, which, viewed in the transport direction 8, is arranged at the end of the extruder screw 3 and is designed for measuring a mass flow of plastic and filler conveyed through the extruder screw 3. Via conduits, which are not illustrated, the throughput scale 17 is connected to the filler metering device 12, with the filler metering device 12 being designed for supplying filler into the cavity 4 as a function of the mass flow as measured by the throughput scale 17.

In a variant, the filler metering device 12 comprises a gas heating element by means of which the air stream 16 is heated.

In a further embodiment, the gas supply is formed by a compressor directly attached to the connection 14.

Figure 2:
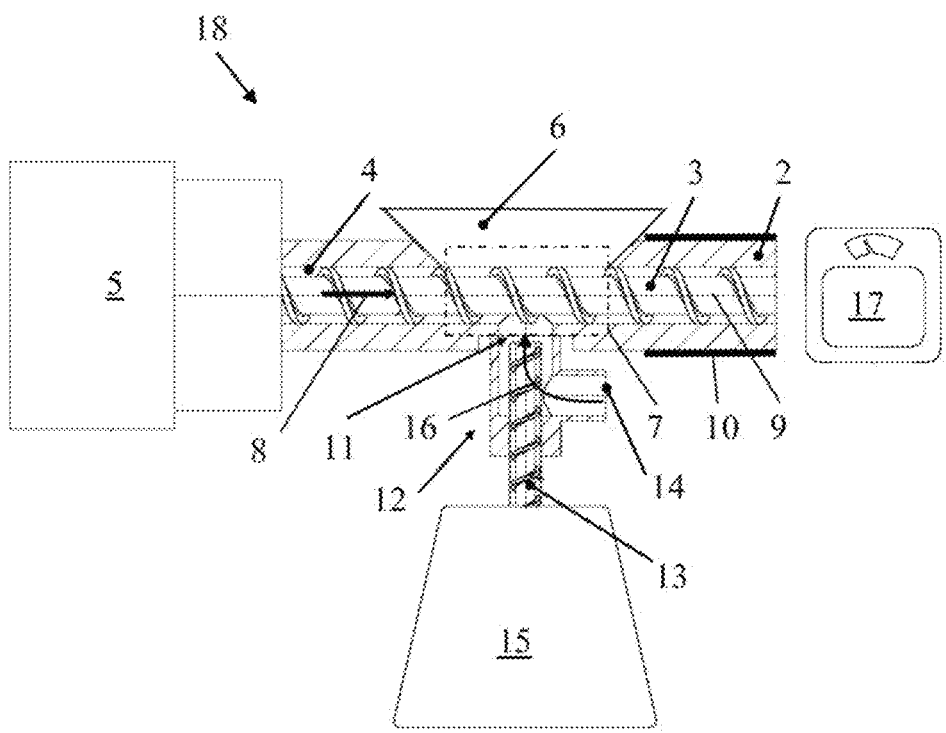

FIG. 2 shows a second embodiment of a device 18 according to the invention in a schematic sectional view. The device 18 differs from the device 1 according to FIG. 1 only in that the feeding port 11 is arranged in the feed zone 7 of the extruder screw 3.

Figure 3:
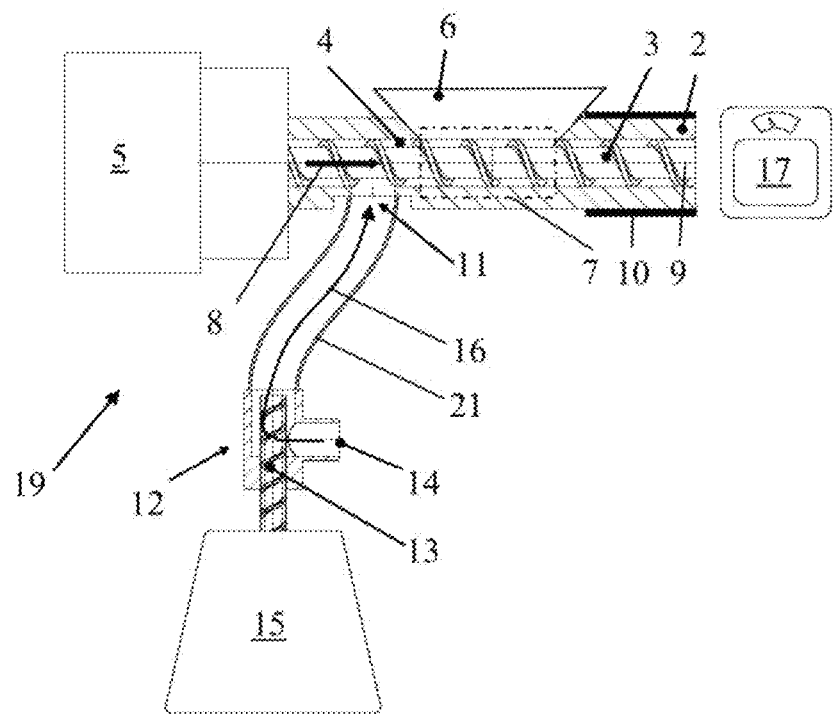

FIG. 3 shows a third embodiment of a device 19 according to the invention in a schematic sectional view. The device 19 differs from the device 1 according to FIG. 1 only in that the device 19 additionally has a hose 21 and the filler metering device 12 is arranged at a distance from the housing 2, with the filler metering device 12 being connected to the feeding port 11 via the hose 21. By using the hose 21, the advantage is obtained that the filler is conveyed in the air stream 16 over a longer period of time and thus the powdery filler is distributed more finely in the air stream 16. Furthermore, in a device 19 comprising a filler metering device 12 with a gas heating element, drying of the moist powdery filler is improved by the hose 21, since, when the hose 21 is provided, the powdery filler will remain in the heated air stream 16 for longer and thus will be dried over a longer period of time.

In a further embodiment, a pipe is provided as an alternative to the hose 21.

Figure 4:
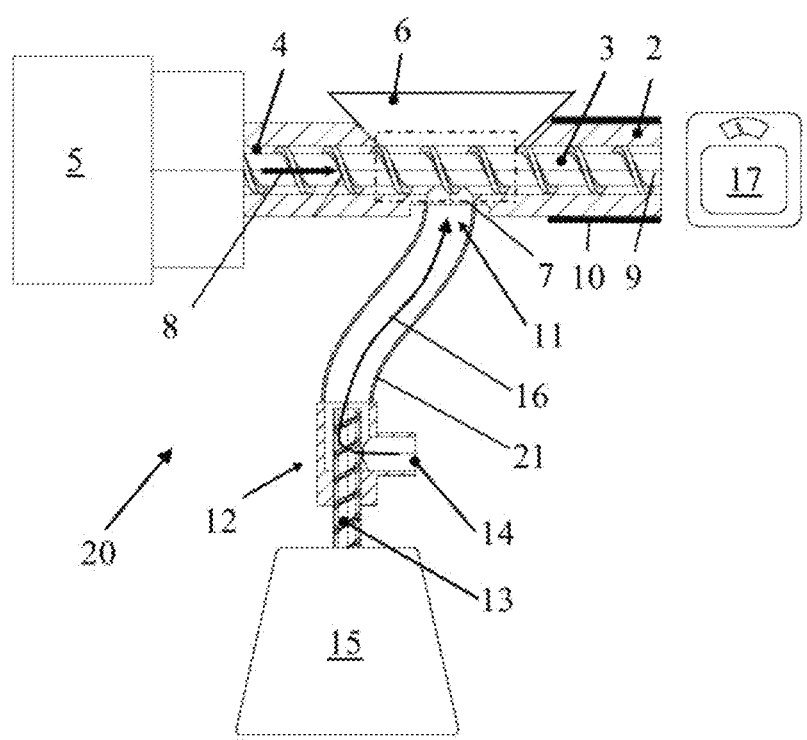

FIG. 4 shows a fourth embodiment of a device 20 according to the invention in a schematic sectional view. The device 20 differs from the device 19 according to FIG. 3 only in that the feeding port 11 is arranged in the feed zone 7 of the extruder screw 3.

Figure 5:
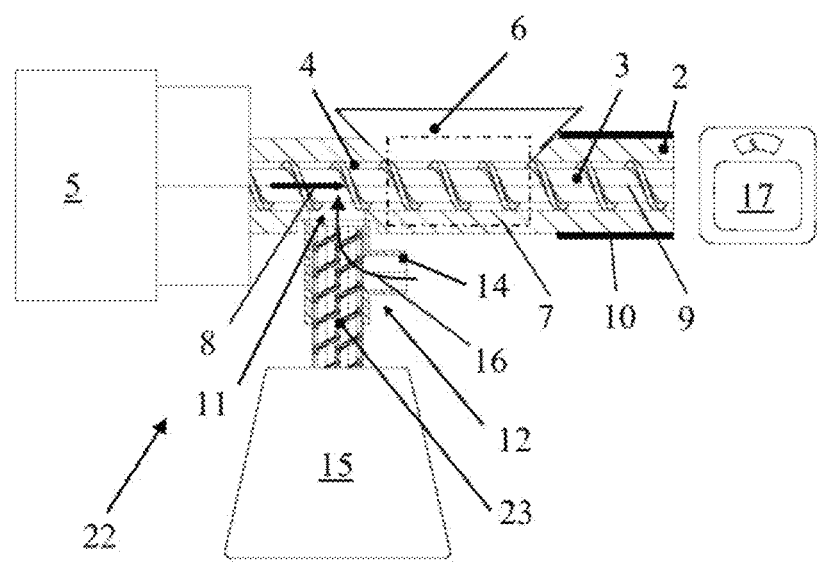

FIG. 5 shows a fifth embodiment of a device 22 according to the invention in a schematic sectional view. The device 22 differs from the device 1 according to FIG. 1 only in that the filler metering device 12 has a twin metering screw 23 instead of a simple metering screw.

In this connection, it should also be pointed out that the devices 1, 18, 19, 20 and 22 can also be designed without a throughput scale and a quantity of powdery filler supplied into the cavity 4 is adjusted via a rotational speed of the metering screw 13 or, respectively, the twin metering screw 23. In doing so, the speed of the metering screw 13 or, respectively, the twin metering screw 23 is advantageously a function of a rotational speed of the extruder screw 3.

Furthermore, it should also be pointed out in this connection that the filler metering device 12 of the device 18, 19 and 20 can also be designed with a twin metering screw 23 rather than with a simple metering screw.

The invention claimed is:

1. A device configured to extrude plastics, comprising:
   an extruder screw,
   a housing with a cavity in which the extruder screw is rotatably arranged, the cavity having an upstream end and a downstream end,
   a drive unit configured to rotatably drive the extruder screw,
   a heating element arranged on the housing alongside the extruder screw,
   a filling unit connected to the housing in a feed zone of the extruder screw and through which shredded plastic can be supplied into the cavity, and the feed zone is located between the upstream end of the cavity and the downstream end of the cavity, wherein, upon rotation, the extruder screw conveys the shredded plastic in the transport direction along a longitudinal axis of the extruder screw, carrying the extruded plastic out of the cavity through a plastics discharge port formed in the housing, and
   a filler metering device,
   wherein the housing has a feeding port opening into the cavity and configured to convey a filler into the cavity,
   wherein the filling unit is connected to the housing independent from the feeding port, and viewed in the transport direction,
   wherein the feeding port is arranged upstream of the feed zone or in the feed zone of the extruder screw,
   wherein the filler metering device is connected to the feeding port and is configured to supply the filler into the cavity, as the filler is dispersed in a gas stream,
   wherein the device further comprises a throughput scale, which, viewed in the transport direction, is arranged at a downstream end of the extruder screw and is configured to measure a mass flow of plastic and filler conveyed through the extruder screw, and
   wherein the filler metering device is configured to supply filler into the cavity as a function of the mass flow measured by the throughput scale.

2. A device according to claim 1, wherein the housing has a gas discharge port opening into the cavity and the device comprises a suction device which is connected to the discharge port and is configured to discharge gas from the cavity, which has been introduced into the cavity via the gas stream.

3. A device according to claim 1, wherein the device comprises a reservoir and the filler metering device has a connection configured to be connected to a gas supply, which gas supply generates the gas stream, wherein the filler metering device comprises a filler conveying device, and wherein the filler conveying device is configured to supply the filler from the reservoir into the gas stream.

4. A device according to claim 3, wherein the filler conveying device comprises a metering screw or a twin metering screw.

5. A device according to claim 1, wherein the filler metering device is arranged at a distance from the housing and the device comprises a hose or a pipe for connecting the filler metering device to the feeding port.

6. A device according to claim 1, wherein the filler metering device comprises a heating element which heats the gas stream.

7. A method of extruding plastics with an extruder screw arranged in a cavity of a housing, the cavity having an upstream end and a downstream end, which extruder screw is rotatably driven by a drive unit, with a heating element being arranged on the housing alongside the extruder screw for heating the cavity,
   wherein, via a filling unit connected to the housing in a feed zone of the extruder screw, shredded plastic is supplied into the cavity between the upstream end of the cavity and the downstream end of the cavity,
   wherein, upon rotation of the extruder screw, the shredded plastic is conveyed in a transport direction along a longitudinal axis of the extruder screw and is discharged through a discharge port,
   wherein a filler dispersed in a gas stream is supplied into the cavity through a feeding port formed in the housing by a filler metering device,
   wherein the feeding port, as seen in the transportation direction, is arranged before the feed zone or within the feed zone of the extruder screw,
   wherein the filling unit is connected to the housing independent from the feeding port,
   wherein an amount of filler supplied into the cavity is adjusted as a function of a mass flow of plastic and filler measured at a downstream end of the extruder screw viewed in the transport direction.

8. A method according to claim 7, wherein the filler is supplied to the cavity in a heated gas stream.

* * * * *